(12) United States Patent
Van de Roer et al.

(10) Patent No.: US 11,258,950 B1
(45) Date of Patent: Feb. 22, 2022

(54) APPARATUS AND METHOD FOR RECORDING A SCENE FOR A PLURALITY OF LIGHTING SETUPS USING ONLY A PORTION OF EACH CINEMATIC FRAME

(71) Applicants: Carlo Van de Roer, Venice, CA (US); Stuart Rutherford, Brooklyn, NY (US)

(72) Inventors: Carlo Van de Roer, Venice, CA (US); Stuart Rutherford, Brooklyn, NY (US)

(73) Assignee: Satellite Lab, LLC, Lewes, DE (US)

( * ) Notice: Subject to any disclaimer, the term of this patent is extended or adjusted under 35 U.S.C. 154(b) by 0 days.

(21) Appl. No.: 17/191,659

(22) Filed: Mar. 3, 2021

(51) Int. Cl.
*H04N 5/232* (2006.01)
*H04N 5/235* (2006.01)

(52) U.S. Cl.
CPC ....... *H04N 5/23277* (2013.01); *H04N 5/2354* (2013.01)

(58) Field of Classification Search
CPC .. H04N 5/23277; H04N 5/2354; H04N 5/235; H04N 5/2355; H04N 5/232
See application file for complete search history.

(56) References Cited

U.S. PATENT DOCUMENTS

| | | | |
|---|---|---|---|
| 7,436,403 B2 | 10/2008 | Debevec | |
| 9,280,034 B2 | 3/2016 | Libreri et al. | |
| 9,743,010 B1 | 8/2017 | Edwards | |
| 2010/0049488 A1 | 2/2010 | Benitez et al. | |
| 2011/0242334 A1* | 10/2011 | Wilburn | H04N 5/272 348/207.1 |
| 2015/0062863 A1 | 3/2015 | Libreri et al. | |

* cited by examiner

*Primary Examiner* — Yogesh K Aggarwal
(74) *Attorney, Agent, or Firm* — Russ Weinzimmer & Associates, P.C.

(57) ABSTRACT

Apparatus for recording a scene using a plurality of lighting setups in rapid sequence to concurrently record a plurality of motion picture clips of the scene, one motion picture clip for each lighting setup, the plurality of clips together exhibiting negligible motion offset. The apparatus includes a plurality of light sources, a controller to define the plurality of lighting setups using the plurality of light sources and to actuate the lighting setups in sequence, a camera to capture a sequence of micro frames showing the scene illuminated by each one of the plurality of lighting setups in sequence during each micro frame, and optionally a processing module to process the sequence of micro frames to generate a motion picture clip of the scene for each of the lighting setups. The duration of the micro frame sequence is short enough to minimize the need for an algorithm for removing motion artifacts.

11 Claims, 11 Drawing Sheets

APPARATUS AND METHOD FOR RECORDING A SCENE FOR A PLURALITY OF LIGHTING SETUPS USING ONLY A PORTION OF EACH CINEMATIC FRAME

FIELD OF THE INVENTION

This invention relates generally to illuminating and recording scenes using multiple lighting setups, and particularly to producing motion picture footage of a scene for each of a plurality of lighting setups.

BACKGROUND OF THE INVENTION

Lighting Setups

In the film industry, it is common to use different lighting setups to add creative and/or technical value to a motion picture. It can be advantageous to film the same scene under different lighting conditions, and later choose the most desirable lighting effect for the scene.

Furthermore, it can be desirable to have the option of combining different lighting setups in post-production. Traditionally, multiple "takes" are filmed using different lighting setups, and are then edited to restore the continuity of a motion picture scene. This is because, with traditional motion picture film technology, it is not possible to film a motion picture scene using multiple lighting setups in only one "take".

Types of Image Frames

In the following discussion we will use the following terms:

1) "high-speed frame" (micro frame) refers to a high-speed image capture frame using a high-speed camera. For example, a high-speed frame can be acquired every $1/4800^{th}$ of a second by a high-speed image capture camera set to acquire images at 4800 frames per second.

2) "cinematic frame" (macro frame) refers to a standard cinematographic film frame, as used when acquiring frames at the standard cinematographic film rate of 24 frames per second.

3) "FPS" refers to "frames per second".

Motion Artifacts at Cinematic Speed

As many movie-goers and cinematographers are aware, the standard cinematic frame rate of 24 FPS is slow enough to cause motion artifacts when movement occurs rapidly within a scene during recording. Another standard cinematic frame rate motion artifact recognizable to many movie-goers is "motion blur", i.e., a blurred quality in the moving image as a 24 FPS camera is moved to pan across a panoramic scene. This motion artifact is caused by the apparent motion of the scene created by the camera's movement, in combination with the relatively slow 24 FPS cinematic frame rate.

A 24 FPS cinematic frame rate corresponds to one frame every $1/24^{th}$ of a second, or 41.6667 milliseconds duration per cinematic frame. Clearly, motion artifacts often occur when the motion is captured at cinematic frame rates having frame durations of 41.6667 milliseconds.

In addition, if there is movement of the subject being filmed during a cinematic frame, the image data captured near the beginning of the cinematic frame of 41.6667 milliseconds will not "line up" with the image data captured near the end of the cinematic frame, thereby causing motion artifacts. Often, this motion artifact will appear as a blurring of the image. Additionally, image data captured only partway through the cinematic frame of 41.6667 milliseconds may not "line up" with image data captured near the beginning of the cinematic frame. In fact, in the case of rapid subject movement, image data that is captured only a few milliseconds apart may have motion artifacts. In general, the more rapid the motion, the more motion artifacts become visible.

Motion Artifacts at High-Speed

A high-speed camera captures high-speed frames of image data. A typical high-speed camera can operate at 4800 frames per second. A high-speed camera operating at 4800 FPS captures image data every $1/4800^{th}$ of a second, or every 0.2083 milliseconds.

The use of a high-speed camera operating at 4800 FPS dramatically reduces motion artifacts, since the images are captured so close together in time. However, high-speed cameras generate much more image data than a standard cinematic frame rate camera.

For a high-speed camera operating at 4800 FPS, the ratio of the number of high-speed frames per standard cinematic frame is:

4800 FPS/24 FPS=200

Therefore in this example, 200 high-speed frames of image data are captured per standard cinematic frame.

Accordingly, much more image data will be captured from a typical high speed camera. Therefore, despite the advantages of using a high speed camera, a serious drawback to such a camera is the amount of memory needed for image data storage when using a high-speed frame rate, versus filming at the standard cinematic frame rate of 24 FPS.

Debevec, U.S. Pat. No. 7,436,403 B2

In an attempt to address the issue of capturing multiple lighting setups in one filming "take", Debevec teaches a lighting apparatus that can be configured to illuminate a subject while the subject is undergoing a motion. The lighting apparatus uses a controller configured to control a plurality of lights at different locations to illuminate the subject from different directions and with different light intensities. Many different illuminations occur within the duration of each cinematic frame. The timings of the different light illuminations are determined by the controller so as to sequentially illuminate the subject with a time-multiplexed series of lighting conditions.

In Debevec, an imaging system, typically a high-speed camera with a constant frame rate, records the subject by continuously recording high-speed image data, captured from a time-multiplexed series of short-duration lighting conditions. This process essentially takes many high speed "snapshots" of the subject over the entire duration of each cinematic frame, and then, after post-processing, a basis set is selected from at least some of the "snapshots", which are combined to form a sequence of cinematic frames of the subject. In post-processing, the high-speed image data captured from the time-multiplexed series of lighting conditions may be de-multiplexed and used to reconstruct and synthesize film footage, also called a film "clip", which can be played back at standard cinematographic film speed.

Debevec teaches a high-speed camera continually acquiring images at a constant frame rate, for example 2160 FPS or 4800 FPS. At 4800 FPS, approximately 200 "high-speed frames" or "snapshots" of different light illuminations are captured during the corresponding time interval of each cinematic frame.

Every cinematic frame is reconstructed from some basis set of the 200 high-speed image data captures. Since the high-speed camera is typically operated at a constant speed, the high-speed image data is captured as a sequence of rapidly recorded high-speed frames, spaced approximately every 0.2083 milliseconds apart, throughout the duration of each cinematic frame.

These high-speed frames are then processed, de-multiplexed, and output to desired "cinematic frames", typically being $1/24^{th}$ of a second in duration with the desired output cinematic frame rate of 24 FPS.

Therefore, the apparatus of Debevec teaches recording a subject with a high-speed camera, and then, in post processing, de-multiplexing and overlaying multiple high-speed frames to reconstruct each cinematic frame.

However, the apparatus of Debevec has disadvantages. If the high-speed frames are not corrected for movement within the duration of a cinematic frame, after being de-multiplexed and before being superimposed to form a cinematic frame, the resulting cinematic frame can show motion artifacts. These motion artifacts result from a separation distance between a first image of the subject from a first high-speed frame image within a cinematic frame and a later image of the subject from a later high-speed frame image from the cinematic frame, when the first and later high-speed frames are superimposed within the same cinematic frame.

Because the different high-speed frames are captured every 0.2083 milliseconds throughout the duration of each cinematic frame, there are time delays as large as 41.6667−0.2083=41.4583 milliseconds between different high-speed frames within the same cinematic frame. These intra-cinematic frame delays can cause motion artifacts. In this example, there are 200 micro frames captured and used to reconstruct each cinematic frame, the number and types of possible motion artifacts are very large.

Therefore, the apparatus of Debevec must correct for motion artifacts between the different high-speed frame images recorded within the duration of each cinematic frame. After the recorded data is de-multiplexed, complex and burdensome optical flow algorithms are often required to remove these motion artifacts.

The apparatus of Debevec has other disadvantages. A high-speed camera with a constant frame rate must record a burdensomely large quantity of image data, because each cinematic frame requires capturing a large amount of high-speed frame image data. As calculated previously, a high-speed camera typically captures 200 times the amount of image data as captured by a standard cinematic camera of the same resolution and bit depth. The resulting overabundance of image data is costly to store. As a result, the maximum length of time of the recording may be limited to only a few seconds, unless costly image data storage equipment is used. Further, to reduce the image data storage requirements, the quality of the stored images may need to be reduced, providing film footage with lower than ideal resolution and image quality.

In addition, in Debevec the positions of the light source may be constrained to a specific arrangement, such as a surrounding dome shape. In the apparatus of Debevec, the complexity of the lighting setup increases the time, difficulty, and expense of filming.

SUMMARY OF THE INVENTION

The apparatus of the invention employs a camera configured to record high-speed frames (also called "micro frames") only during a portion of each cinematic frame, (also called a "macro frame"), to efficiently record a scene with multiple lighting setups, all in one "take", with minimal motion offset among the micro frames, and with minimal image data storage requirements.

The apparatus of the invention enables illumination and recording of a scene such that multiple lighting setup illuminations of the scene can be captured concurrently using a high-speed digital cinema camera capable of recording micro frames only during a portion of each macro frame. Further, the settings of the camera can be changed for each micro frame. Each such high-speed frame (micro frame) corresponds to a respective lighting setup.

Each of the lighting setups is recorded as a micro frame image data capture of the same scene. The sequence of micro frames has negligible motion offset because the micro frames are captured so rapidly in a burst of a duration substantially less than a macro frame that the scene does not appreciably change while the micro frames are being captured during each macro frame.

"Motion offset" refers to apparent motion of an object in the scene upon transition from a micro frame illuminated by a first lighting setup to a micro frame illuminated by a subsequent lighting setup. Motion offset can also refer to the separation distance between a first image of the object due to a first lighting setup and a later image of the object due to a later lighting setup, when the first and later images are de-multiplexed and included in a cinematic frame sequence.

Because the micro frames are captured as part of a sequence of micro frames of substantially short time duration relative to each macro frame, the benefits of the invention include minimized motion offset, thereby substantially minimizing the need to employ complex optical flow algorithms to remove motion artifacts.

The micro frames captured during a portion of the time interval of each cinematic frame (macro frame), are captured together in a sequence of short time duration compared to the duration of a cinematic frame (macro frame). Because the high speed camera records a sequence of micro frames only during a limited duration of each cinematic frame (macro frame), the image data stored is less than the image data that must be stored when recording micro frames continuously during an entire cinematic (macro) frame.

In addition, according to the invention, the positions of the light sources are not constrained, permitting more creative expression via freedom to place each light source where needed or desired, thereby facilitating rapid light setup and consequent reduced time, difficulty, and expense of filming.

Further, the apparatus of the invention enables use of industry-standard lighting equipment, as well as non-standard lighting equipment.

The plurality of lighting setups is sequentially captured using at least one different light source and also possibly different camera settings for each micro frame within each macro frame being recorded by the camera. A controller (that is configurable via software) detects the micro frames being recorded by the camera, and triggers the corresponding lights of respective lighting setups on specific respective micro frames to record the plurality of different lighting setups. The camera can also be set up (either using a control menu on the camera, or via an API) to have different settings for each micro frame within a macro frame.

Once the micro frame image data has been recorded, the micro frames of each macro frame can be separated into a plurality of respective sets of micro frames, each set corresponding to one of the plurality of lighting setups. Each set of micro frames for a particular lighting setup can then be processed and output as an individual clip consisting of a sequence of cinematic frames (macro frames), thereby providing one complete clip of the same scene for each lighting setup of the plurality of lighting setups.

There will be at least one synced light source in each lighting setup, but there can be more than one synced light source, and there can be synced light sources in more than one lighting setup, or even in all lighting setups. Additionally, the lighting setups can change from one micro frame to the next micro frame. For example, one or more light sources can be dimmed, and/or the lighting level can be brought up during the capture of the micro frames. The same light source can be used for more than one setup, and additionally the level of this light source can be changed per micro frame.

A plurality of groups/sets of light sources are first positioned in the desired locations, and configurable software in the controller then controls which light sources are fired for each micro frame that is recorded by the camera. Each of the plurality of lighting setups is fired for each cinematic frame. The micro frames corresponding to the lighting setups in each cinematic frame can then be extracted from the entire cinematic frame sequence to create a set of clips of footage. Each clip of footage shows the scene under one lighting setup. These clips of footage can be combined in post-processing for creative or technical flexibility and efficiency.

The invention can be used to concurrently record a plurality of lighting setups of live action which can be used as separate clips of footage. For example:
 Lighting representative of different times and places.
 Each of the various lights required to light a single scene.
 Scene lighting and VFX lighting for tracking, chroma key, or effects.
 Different creative lighting set-ups.

A general aspect of the invention is an apparatus for recording a scene using a plurality of lighting setups so as to concurrently record a respective plurality of motion picture clips of the scene, one motion picture clip for each lighting setup. The apparatus includes: a plurality of light sources, each light source configured to illuminate at least part of a scene; a controller configured to: enable a user to define a plurality of lighting setups using the plurality of light sources, and actuate the plurality of lighting setups in accordance with timing signals so as to provide a sequence of lighting setups; and a camera configured to capture a sequence of macro frames, each macro frame being of a duration so as to include a sequence of micro frames, the sequence of micro frames being of a duration of no more than substantially 21 milliseconds, each micro frame initiated by a timing signal, and at least one micro frame being capable of capturing the scene illuminated by one of the plurality of lighting setups.

In some embodiments, the camera is a variable frame rate camera configured to capture micro frames during only a portion of each macro frame, the portion corresponding to the duration of the sequence of micro frames.

In some embodiments, the variable frame rate camera is configured to capture only the sequence of micro frames in each macro frame.

In some embodiments, the variable frame rate camera is configured to capture at least one long micro frame after capturing the sequence of micro frames, the long micro frame being of an extended duration configured to capture light from a continuous light source.

In some embodiments, the camera is a constant frame rate camera configured to record during only a portion of each macro frame, the portion corresponding to the duration of the sequence of micro frames.

In some embodiments, the apparatus further includes; a processing module configured to assemble a plurality of motion picture clips, each motion picture clip assembled from a sequence of corresponding micro frames of the sequence of macro frames, each motion picture clip corresponding to one of the lighting setups.

In some embodiments, the controller is configured to actuate the plurality of lighting setups in sequence in accordance with the timing signals, such that a first lighting setup of the plurality of lighting setups is actuated by a timing signal upon a beginning of a macro frame, and a last lighting setup of the plurality of lighting setups is actuated by a timing signal such that the last lighting setup will go dark before an end of the macro frame.

In some embodiments, the timing signals are derived from the camera.

In some embodiments, the timing signals are derived from an external controller.

In some embodiments, the controller is configured to enable the user to include at least one camera parameter that can change for each micro frame, and sequentially actuate the at least one camera parameter for each of the micro frames in accordance with timing signals.

In some embodiments, the at least one camera parameter can include at least one of: sensitivity (ISO); aperture; ND (neutral density filter); and shutter angle.

In some embodiments, each lighting setup of the plurality of lighting setups is different from other lighting setups in the plurality of lighting setups.

BRIEF DESCRIPTION OF THE DRAWINGS

Many additional features and advantages will become apparent to those skilled in the art upon reading the following description, when considered in conjunction with the accompanying drawings, wherein.

DETAILED DESCRIPTION

Figure 1:
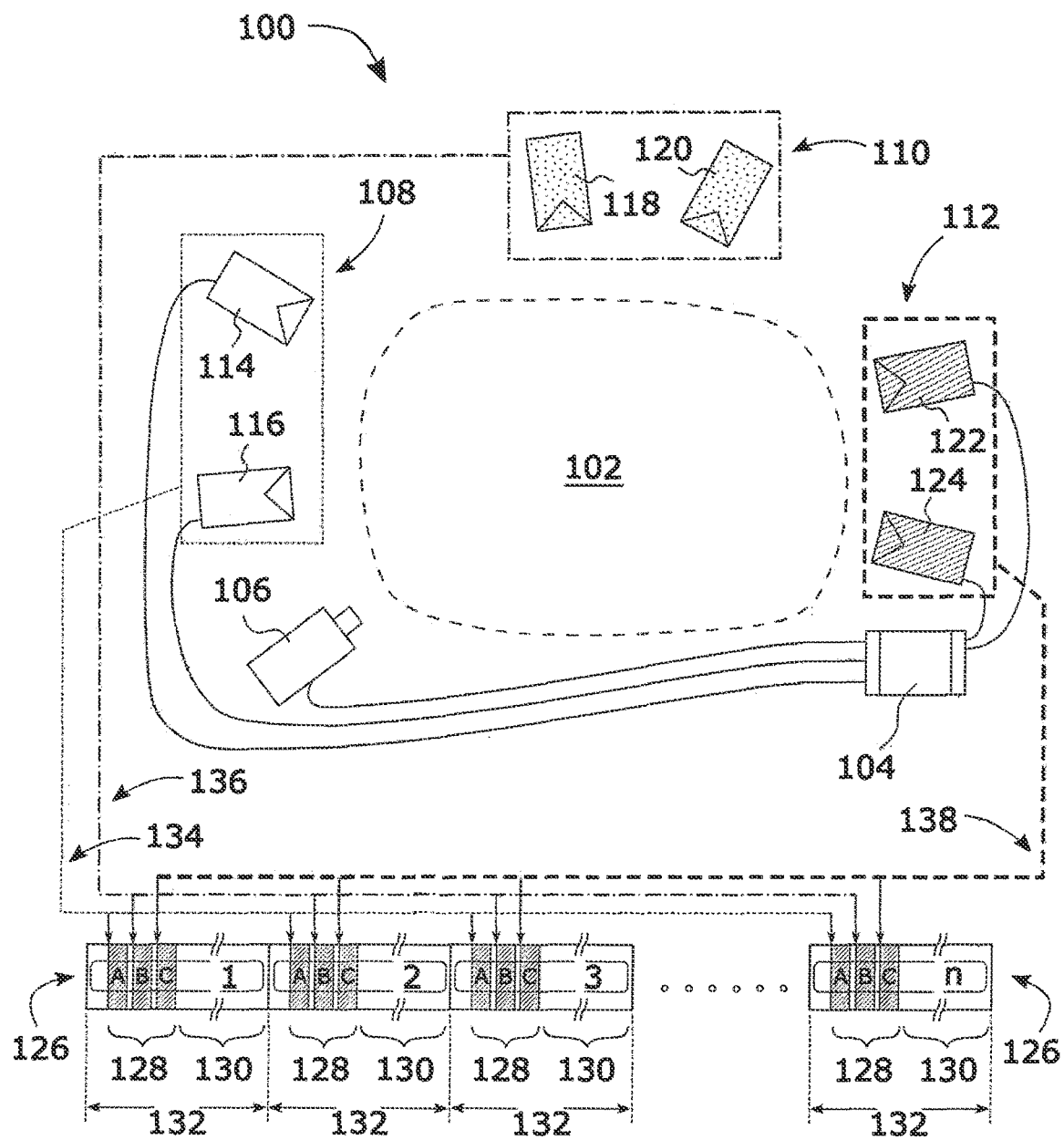
FIG. 1 is a schematic diagram of a scene illuminated sequentially by three lighting setups, each lighting setup having two strobe lights, using a sequence of three micro frames with minimal motion offset corresponding to the three lighting setups, each lighting setup being controlled by a controller that receives timing signals from a camera recording the scene, also showing a frame sequence diagram of a corresponding macro (cinematic) frame sequence, each macro frame having three micro frames and no long frame.

With reference to FIG. 1, a schematic diagram is presented of an apparatus 100 for illuminating and recording a scene 102 using three lighting setups 108, 110, 112. In this embodiment 100, each lighting setup 108, 110, 112 has two light sources that are capable of providing strobed light. The apparatus 100 includes a controller 104 in communication with a camera 106 configured to record the scene 102.

The controller 104 is also in communication with lighting equipment consisting of: a light source 114, a light source 116, a light source 118, a light source 120, a light source 122, and a light source 124. The light sources are grouped into three lighting setups: a first lighting setup 108 consisting of light source 114 and light source 116, a second lighting setup 110 consisting of light source 118 and light source 120, and a third lighting setup 112 consisting of light source 122 and light source 124.

Each light source that is capable of providing strobed light can be one or more LEDs, or a Xenon strobe light, or other light source that can be switched on and off relatively rapidly, i.e., any light source that can exhibit strobe light behavior.

Flash duration of a light source is commonly described by two numbers that are expressed in fractions of a second:
  t.1 is the length of time the light intensity is above 0.1 (10%) of the peak intensity
  t.5 is the length of time the light intensity is above 0.5 (50%) of the peak intensity For example, a single flash event might have a t.5 value of $1/1200$ and a t.1 value of $1/450$. These values determine the ability of a flash to "freeze" moving subjects in applications such as sports photography.

Individual strobe flashes typically last approximately 200 microseconds, i.e., 0.2 milliseconds, i.e., ⅕ of a millisecond, but can be sustained for greater or lesser periods of time, depending on the strobe's intended use.

Here are some time durations for comparison:
  0.2 milliseconds—duration of a typical strobe flash
  1 millisecond (1 ms)—duration of a typical photo flash.
  2 milliseconds to 5 milliseconds—typical response time in LCD computer monitors, especially high-end displays
  8 milliseconds—$1/125$ of a second, a standard still camera shutter speed (125)
  16.68 milliseconds (1/59.94 second)—the amount of time one field lasts in 29.97 fps interlaced video (commonly but erroneously referred to as 30 fps)
  33.367 milliseconds—the amount of time one frame lasts in 29.97 fps video (most common for NTSC-legacy formats)
  41.667 milliseconds—the amount of time one frame lasts in 24 fps video (most common cinematic frame rate)
  41.708 milliseconds—the amount of time one frame lasts in 23.976 fps video (cinematic frame rate for NTSC-legacy formats)
  134 milliseconds—the time taken by light to travel around the Earth's equator
  200 milliseconds—the time it takes the human brain to recognize emotion in facial expressions
  300 to 400 milliseconds—the time for the human eye to blink
  1000 milliseconds—the time for one second to pass.

The camera 106 records the action in scene 102 as a sequence of macro frames 126. Each macro frame 132 of the sequence 126 can be a cinematic frame with a duration of 41.6667 milliseconds, or $1/24^{th}$ of a second. However, each macro frame 132 may be of a longer or shorter duration, depending on the desired cinematic film rate.

In some embodiments, the camera can be a high-speed variable frame rate camera. The high-speed variable frame rate camera can be configured to record during only a portion 128 of each macro frame 132, the portion 128 corresponding to the duration of the sequence of micro frames A, B, C relative to the total duration 128 and 130 of the macro frame. The high-speed variable frame rate camera can also be configured to not record during the remainder 130 of the duration 132 of each macro frame. Alternatively, the high-speed variable frame rate camera can be programmed to define at least one long frame as a "throw away" frame, to define a time period during the macro frame where the image data is not needed for post-processing. The long frame can also be used to capture continuous light from a continuous light source, as will be explained with reference to FIG. 3 below.

Figure 3:
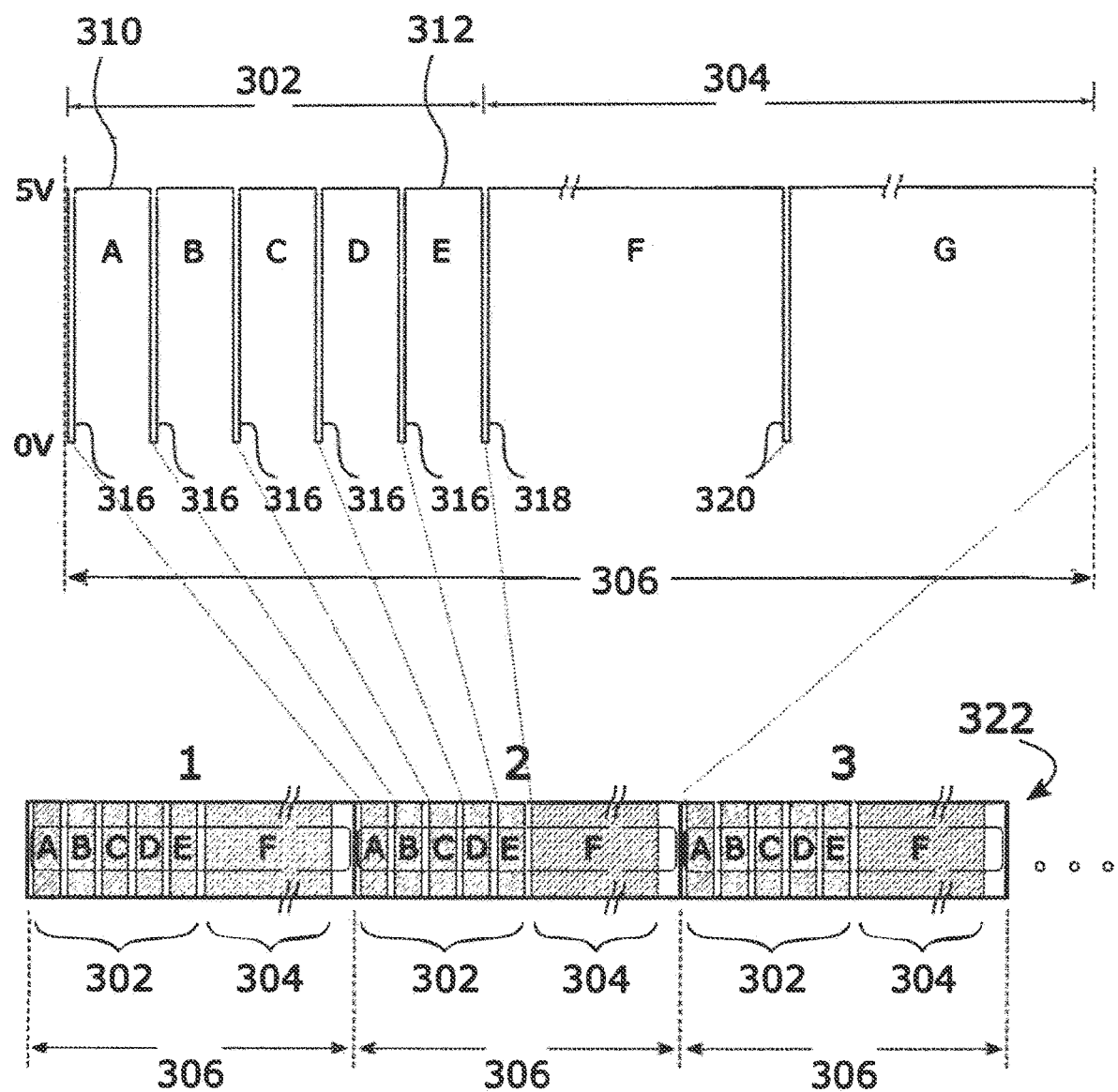
FIG. 3 is a frame sequence diagram of a sequence of three macro frames, each macro frame including a sequence of five micro frames followed by one or two optional long frames, each micro frame for capturing light from a strobed lighting setup, and each long frame for capturing light from a continuous light source, where one macro frame is expanded into a corresponding timing diagram showing five micro frame low trigger signals, and two long frame low trigger signals.

The high-speed variable frame rate camera can be programmed to precisely change the frame rate within the duration of each macro frame. For example, a high-speed variable frame rate camera can be programmed to record a 400 microsecond micro frame duration, followed by a much longer 40,000 microsecond long frame duration within the same macro frame, as shown in FIG. 3, for example.

Some examples of high-speed variable frame rate cameras are in the Vision Research Phantom V® series of cameras, featuring Burst Mode Acquisition, which are capable of capturing a sequence of micro frames in a short duration burst, each burst being triggered within each much longer duration macro frame.

In some embodiments, the camera can also be a high-speed constant frame rate camera, if the high-speed constant frame rate camera can be configured to record during only a portion of each macro frame, the portion corresponding to the duration of the sequence of micro frames relative to the total duration of the macro frame. The high-speed constant frame rate camera can be configured to not record during the remainder of the duration of each macro frame after the burst of micro frames.

As shown in FIG. 1, the camera 106 can be a high-speed camera with a variable frame rate that is configured to record a sequence of three micro frames 128, each of short duration, followed by at least one long frame 130 of long duration, to form one macro frame 132. (The one long frame 130 is shown with a broken boundary, indicating that this long frame 130 is much longer in duration than the sequence of three micro frames 128.) Because the sequence of three micro frames 128 is of short duration, there is minimal motion offset within the sequence of three micro frames 128.

In this embodiment, every macro frame 132 of the sequence of macro frames 126 includes a sequence of three micro frames 128 and one long frame 130.

In other embodiments, the number and/or position of the micro frames can be different. For example, in another embodiment, each macro frame can include one long frame followed by a sequence of six micro frames that are of short duration (not shown).

Under control of the controller 104, the scene 102 is sequentially illuminated by the first lighting setup 108, then the second lighting setup 110, and then the third lighting setup 112. The first micro frames A 134 record the scene 102 illuminated by the first lighting setup 108, the second micro frames B 136 record the scene 102 illuminated by the second lighting setup 110, and the third micro frames C 138 record the scene 102 illuminated by the third lighting setup 112.

Lighting intervals A, B, and C are shown indicating the duration of the three micro frame time intervals within the sequence 128 of three micro frames, lighting intervals A, B, and C corresponding to: the first micro frames 134, the second micro frames 136, and the third micro frames 138, respectively.

The controller 104 controls the timing of the lighting intervals A, B, and C within the sequence of the three micro frames 128, and the timing of the long frame 130 (1, 2, 3, . . . n). The lighting intervals A, B, and C are chosen to be in sequence, and short in duration, such that the illumination from the first lighting setup 108, the illumination from second lighting setup 110, and the illumination from the third lighting setup 112 provide minimal motion offset between micro frames corresponding to the three lighting setups.

Each macro frame 132 of the macro frame sequence 126 includes three micro frames 128 corresponding to each of the three lighting setups. The first micro frames 134 (corresponding to the A's) correspond to the first lighting setup 108, the second micro frames 136 (corresponding to the B's) correspond to the second lighting setup 110, and the third micro frames 138 (corresponding to the C's) correspond to the third lighting setup 112.

In some embodiments, the controller 104 is configured to enable the user to include at least one camera parameter that can change for each micro frame, and sequentially actuate the at least one camera parameter for each of the micro frames in accordance with timing signals derived from a micro frame rate of the camera 106. For example, the at least one camera parameter can include at least one of: sensitivity (ISO); aperture; ND (neutral density filter); and shutter angle.

One of average skill in the art will know that it is also possible to replace the controller 104 with a plurality of dedicated controllers, each controller dedicated to controlling a single light, or a single lighting set up. Alternatively, a controller could be built into each light. In these embodiments, each dedicated controller can execute software to control a specific light or lighting set up, and the camera could provide control signals to actuate each dedicated controller.

Figure 2:
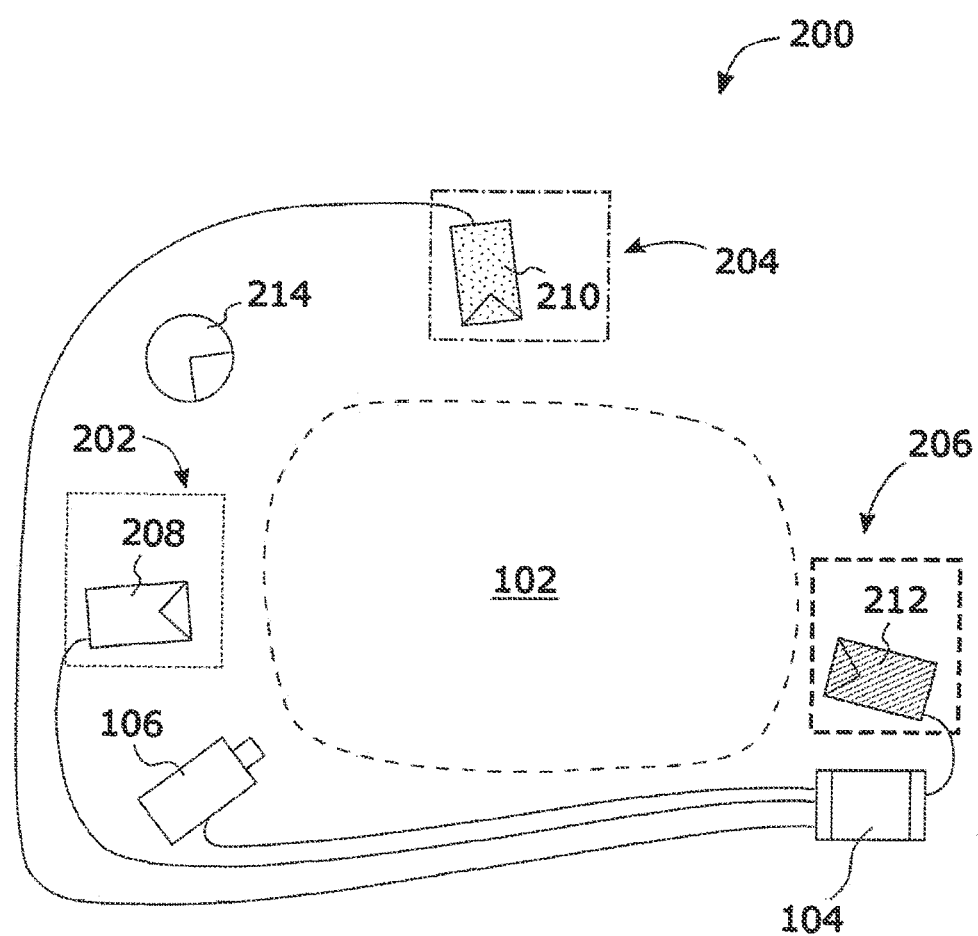
FIG. 2 is a schematic diagram of a scene illuminated sequentially by three lighting setups, each lighting setup being a single strobe light, also including a continuous light source, each lighting setup and the continuous light source being controlled by a controller that receives timing signals from a camera recording the scene.

With reference to FIG. 2, a schematic diagram of a top view of a scene lit with one continuous light source 214 and three strobe light sources 208, 210, 212 is shown of an apparatus 200 for recording a scene 102 using multiple lighting setups. The lighting is divided into three lighting setups 202, 204, 206, each of the lighting setups having one light source: the first lighting setup 202 having the light source 208, the second lighting setup 204 having the light source 210, and the third lighting setup 206 having the light source 212.

Also included is the controller 104 in communication with the camera 106, which is configured to record the scene 102. The controller 104 synchronizes operation of the camera 106 with activation of the lighting setups 202, 204, and 206, each lighting setup providing short duration illumination for the scene 102.

In this embodiment, a continuous light source 214 provides constant illumination for the scene 102.

With reference to FIG. 3, a timing diagram of macro frame 306 having a burst sequence of five micro frames A, B, C, D, E 302, followed by two long frames F, G 304, within a macro frame 306 is shown. The sequence of five micro frames A, B, C, D, E 302 begins with a first micro frame A 310, and ends with a last micro frame E 312. The macro frame 306 is one of a series of macro frames (1, 2, 3) 322, where the macro frame (2) is shown enlarged above the series of macro frames (1, 2, 3) 322.

In this embodiment, the signal voltage alternates between the two binary states of 5.0 volts and 0.0 volts, for example, to provide low trigger signals 316, 318, and 320. In this embodiment, the low trigger signals 316, 318, 320 come from the camera in accordance with a micro frame rate of the camera, and are provided to the controller 104 to activate in sequence seven different lighting setups, for example.

In some embodiments, an external timing source sends a timing signal to the camera.

In other embodiments, an external timing source sends a timing signal to both the camera and to a light controller, or directly to a plurality of lighting setups.

A low-going transition of 5V to 0V represents a trigger signal. Examples of these are the micro frame low trigger signals 316 that start each of the five micro frames A, B, C, D, E, and the long frame low trigger signals 318 and 320. In other embodiments, a high-going transition from 0V to 5V represents a trigger signal.

In this embodiment, the first low trigger signal 316 starts the first micro frame A 310, and the sixth low trigger signal 318 starts the first long frame F, followed by the seventh low trigger signal 320 that starts the second long frame G. The long frames F and G together form the long interval 304. One or both long frames F and G can be used to capture light from a scene illuminated by a continuous light source, such as the continuous light source 214 of FIG. 2 that provides constant illumination for the scene 102.

Regarding F and G, after the short micro frames A, B, C, D, E 316 there are long micro frames F and G which occupy the remaining portion 304 of the macro frame 306. These additional frames F and G can be recorded, or not. When recorded, the long frames F and/or G are typically used to record ambient exposure from the continuous light source(s) 214, or any other continuous light source, including daylight, for example.

The duration of F or G 304 of the macro frame 306 is the product of the macro frame duration 306 and a shutter angle. In this context, the shutter angle is defined as the ratio of the duration of F or G of the macro frame 304 to the duration of the entire macro frame 306. For example, if macro frame 306 is ½₄th of a second, and the shutter angle is 180 degrees (which is half of the overall frame 306), F or G is ⅟₄₈th of a second.

Two possible cases with long frames F and G, for example:

Case 1:

Duration of micro frames 302+Duration of F=(Macro Frame Duration 306)/2

Duration of G=(Macro Frame Duration 306)/2

Case 2:

Duration of micro frames 302+Duration of G=(Macro Frame Duration 306)/2

Duration of F=(Macro Frame Duration 306)/2

One possible case with a single long frame F only, for example:

Duration of micro frames 302+Duration of F=Macro Frame Duration 306

Thus, there can be a long frame F wherein ambient continuous light is captured, and there can be a long frame G wherein ambient continuous light is captured. It is also possible that there are no long frames F or G, and the camera does not record light during 304, only during 302. It is also possible for ambient continuous light to be captured during a long frame F, and there would be no long frame G.

This embodiment includes five micro frame low trigger signals A, B, C, D, E 316 that the camera 106 sends to the controller 104 (shown in FIG. 1) at the beginning of each micro frame A, B, C, D, and E. In this embodiment, these five micro frame low trigger signals A, B, C, D, E 316 communicate to the controller 104 the timings to activate in sequence five different lighting setups.

Also shown are the long frame low trigger signals 318 and 320, which mark the start of the optional frames F and G of the remaining portion 304, during which continuous lighting can be recorded, such as the continuous lighting starting at the long frame low trigger signal 318 and ending at the long frame low trigger signal 320.

The micro frame low trigger signals 316 and the long frame low trigger signals 318 and 320 can be short in duration, such as 1 microsecond, for example. Alternatively, each trigger signal can be the duration of the respective micro frame or of the respective long frame exposure duration.

In some embodiments a high-speed variable frame rate camera can be programmed to define the remaining portion 304 as a "throw away" frame, used to exclude from recording many frames during the macro frame 306 where that image data is not needed for post-processing. This partial frame recording greatly reduces image data storage requirements (versus storing high speed image data and continuous illumination data throughout the entire duration 306 of the macro frame).

Typically, a macro frame 306 includes one to ten micro frames 302. The most useful range is from one to thirty micro frames per macro frame. FIG. 3 shows an example where each macro frame 306 includes a burst sequence 302 of five micro frames A, B, C, D, and E of short duration, and a remaining portion 304 that includes long frames F and G, which are of much longer duration than a micro frame.

In some embodiments, the length of each of the micro frames A, B, C, D, and E is 400 microseconds, and the length of the remaining portion 304 is substantially 39,667 microseconds, corresponding to a cinematic frame rate of ½₄$^{th}$ of a second, or a total macro frame duration of 41,666.67 microseconds. For duration examples, see FIG. 10.

The micro frames A, B, C, D, and E are chosen to be in sequence, and to be of short duration so as to provide minimal motion offset among the images captured within the sequence of five micro frames 302.

Each macro frame 306 is recorded in sequence to form a sequence of macro frames 322.

The camera 106 (shown in FIG. 1) is configured to record a sequence of five micro frames 302, for example, for each macro frame 306. And then for the remainder 304 of the macro frame, possibly also record a long frame F, and further possibly a long frame G, during that macro frame 306. The duration of the sequence of five micro frames 302 begins at the start of the first micro frame 310 and ends at the end of the last micro frame 312.

In some embodiments, the duration of the sequence of five micro frames 302 is less than 5 milliseconds. In the case of a sequence of 1 to ten micro frames, the duration of such a sequence is typically 0.2 to 10 milliseconds. In the case of a sequence of thirty micro frames, the duration of such a sequence is typically less than 30 milliseconds.

The shortness of the duration of the sequence of five micro frames 302 is chosen to reduce motion artifacts, determined by the motion characteristics of the subject being filmed. The more micro frames in the sequence, the more likely motion blur and motion offset will be introduced.

In some embodiments, the controller 104 is configured to actuate the plurality of lighting setups (e.g., 108, 110, 112) in sequence in accordance with the timing signals provided by the camera 106, such that a first lighting setup 108 of the plurality of lighting setups is actuated by a timing signal after a beginning of a macro frame, and a last lighting setup 112 of the plurality of lighting setups is actuated by a timing signal such that the last lighting setup will go dark before an end of the macro frame.

In some embodiments, the timing signals for the micro frames and the long frames are derived from the camera 106, where the timing signals for the short and long micro frames are set in the camera, and provided by the camera 106 to the controller 104, which in turn controls the lighting setups 108, 110, 112, for example.

Figure 4A:
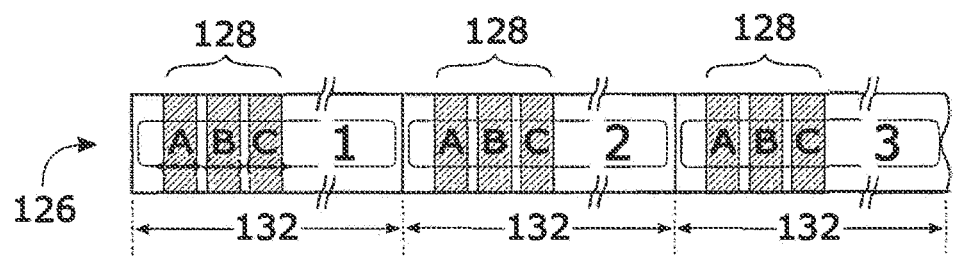
FIG. 4A is a frame sequence diagram of a sequence of three macro frames recorded at a standard cinematic frame rate, each macro frame including a sequence of three micro frames, the macro frames having short-duration lighting intervals that are suitable for a slow-speed motion of the filmed scene.

With reference to FIG. 4A, a frame sequence diagram is shown of a sequence of macro frames 132, starting with the sequence 126 of three macro frames 132. The sequence 126 of macro frames 132 is recorded at a standard cinematic frame rate. Each macro frame 132 includes a burst sequence of micro frames 128, each micro frame 128 being capable of capturing strobed lighting of a duration that is suitable for slow-speed cinematic motion of the filmed scene 102 (shown in FIG. 1). In some embodiments, a standard cinematic frame rate of 24 FPS (frames per second) can be used.

Each macro frame 132 includes a sequence of three micro frames A B C 128 and one long frame (1, 2, 3), the micro frames A B C 128 corresponding to short duration lighting intervals that substantially minimize visual artifacts (such as motion offset between the micro frames A, B, and C corresponding to the three lighting setups) when post processing the sequence of macro frames 126, if slow-speed motion is present in the scene 102.

Figure 4B:
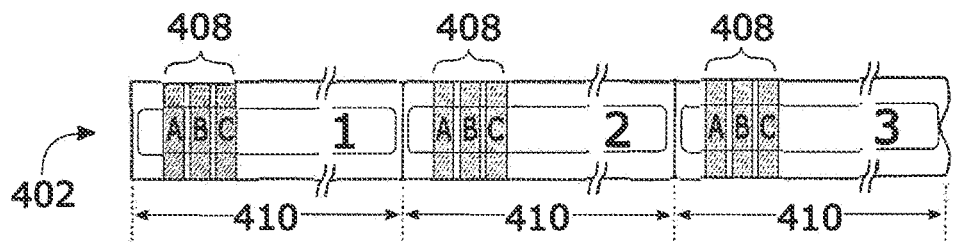
FIG. 4B is a frame sequence diagram of a sequence of three macro frames recorded at a standard cinematic frame rate, each macro frame including a sequence of three micro frames, the macro frames having short-duration lighting intervals that are suitable for a standard-speed motion of the filmed scene.

With reference to FIG. 4B, a schematic diagram is shown of a sequence 402 of macro frames 410, recorded at a standard cinematic frame rate, and with a short duration sequence of micro frames A B C 408 that is suitable for standard-speed cinematic motion of the filmed scene 102 (shown in FIG. 1).

Each macro frame 410 includes a sequence of three micro frames A B C 408 and one long frame (1, 2, 3), the micro frames A B C corresponding to short duration lighting intervals that substantially minimize visual artifacts (such as motion offset between the micro frames A, B, and C corresponding to the three lighting setups) when post processing the sequence of macro frames 402, if standard-speed motion is present in the scene 102.

Figure 4C:
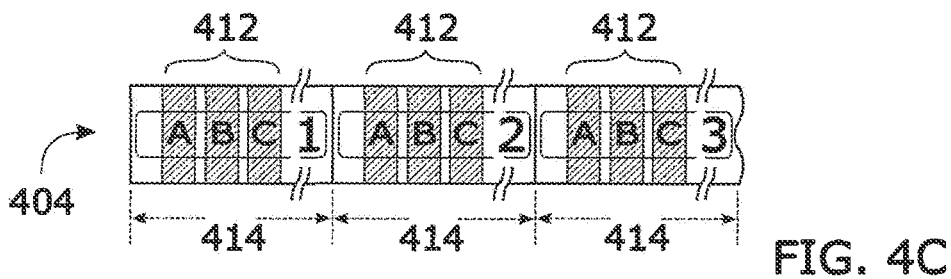
FIG. 4C is a frame sequence diagram of a sequence of three macro frames recorded at a rapid cinematic frame rate, each macro frame including a sequence of three micro frames, the macro frames having short-duration lighting intervals that are suitable for a slow-speed motion of the filmed scene.

With reference to FIG. 4C, a schematic diagram is shown of the sequence 404 of macro frames 414, recorded at a rapid cinematic frame rate, and with a short duration sequence of micro frames A B C 412 that is suitable for slow-speed cinematic motion of the filmed scene 102 (shown in FIG. 1). In some embodiments, the rapid cinematic frame rate can be 30 FPS, 48 FPS, or 60 FPS.

Each macro frame 414 includes a sequence of three micro frames A B C 412 and one long frame (1, 2, 3), the micro frames A B C corresponding to short duration lighting intervals that substantially minimize visual artifacts (such as motion offset between the micro frames A, B, and C corresponding to the three lighting setups) when post processing the sequence of macro frames 404, if slow-speed motion is present in the scene 102.

Figure 4D:
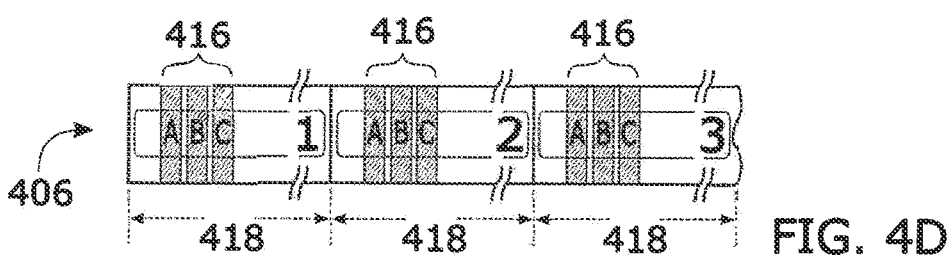
FIG. 4D is a frame sequence diagram of a sequence of three macro frames recorded at a rapid cinematic frame rate, each macro frame including a sequence of three micro frames, the macro frames having short-duration lighting intervals that are suitable for a standard-speed motion of the filmed scene.

With reference to FIG. 4D, a schematic diagram is shown of a sequence 406 of macro frames 418, recorded at a rapid cinematic frame rate, and with a short duration sequence of micro frames A B C 416 that is suitable for standard-speed cinematic motion of the filmed scene 102 (shown in FIG. 1).

Each macro frame 418 includes a sequence of three micro frames A B C 416 and one long frame (1, 2, 3), the micro frames A B C corresponding to short duration lighting intervals that substantially minimize visual artifacts (such as motion offset between the micro frames A, B, and C corresponding to the three lighting setups) when post processing the sequence of macro frames 406, if standard-speed motion is present in the scene 102.

Figure 5:
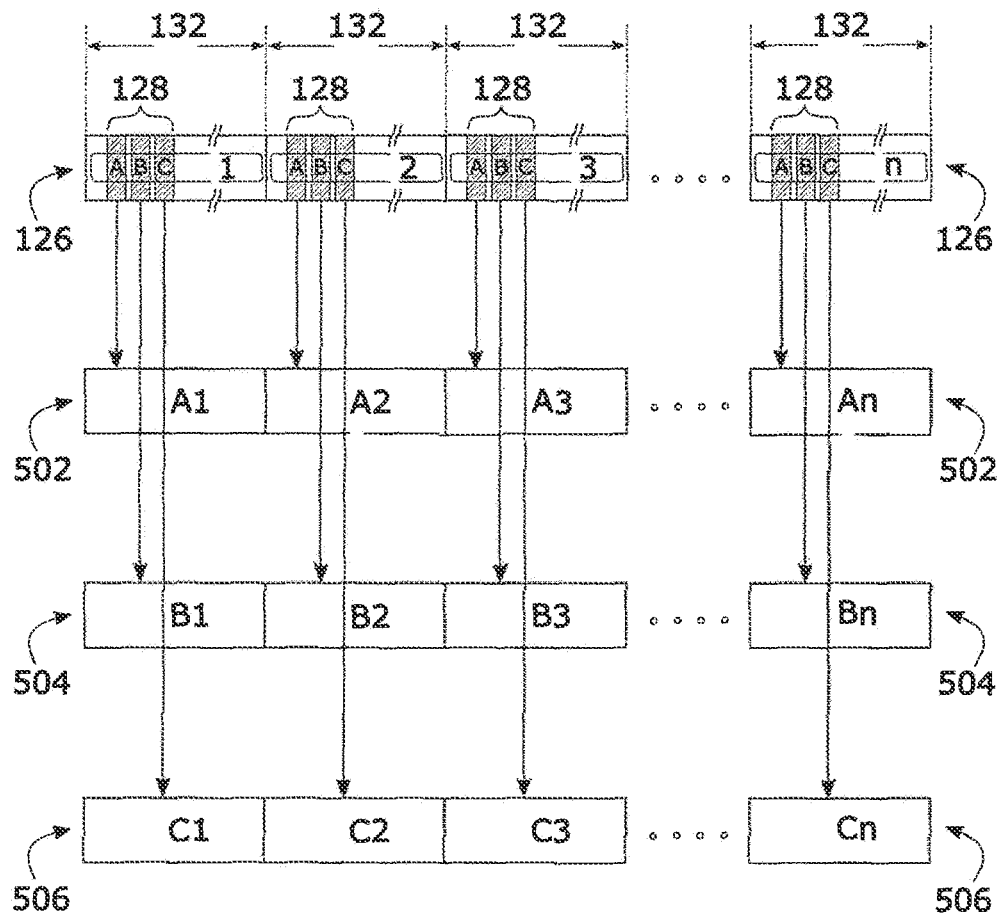
FIG. 5 is a frame sequence diagram showing how to process footage of a scene illuminated sequentially by three lighting setups so as to produce three respective clips of footage of the scene, each clip of footage showing the scene illuminated by one of the three lighting setups.

With reference to FIG. 5, a schematic diagram showing how to process footage of a scene illuminated sequentially by three lighting setups into three individual clips is shown. Each macro frame 132 includes the sequence of micro frames A B C 128 having a short-duration, and one long frame (1, 2, 3), and each macro frame 132 including the micro frames A, B, and C corresponding to the three lighting setups. The sequence of macro frames 126 includes individual macro frames 132 numbered 1 through n, where n is the number of macro frames 132, and n is also equal to the number of frames in the processed film clips.

The sequence of macro frames 126 produce three respective pieces of footage of the scene 102 (shown in FIG. 1), each piece of footage showing the scene illuminated by one of the three lighting setups: the first lighting setup 108, the second lighting setup 110, and the third lighting setup 112 (each shown in FIG. 1). The "A" micro frames producing the "A" frames in a first frame clip 502, the "B" micro frames producing the "B" frames in a second frame clip 504, and the "C" micro frames producing the "C" frames in a third frame clip 506.

Three respective clips 502, 504, 506 of footage of the scene are produced, each clip of footage showing the scene illuminated by one of the three lighting setups.

Figure 6:
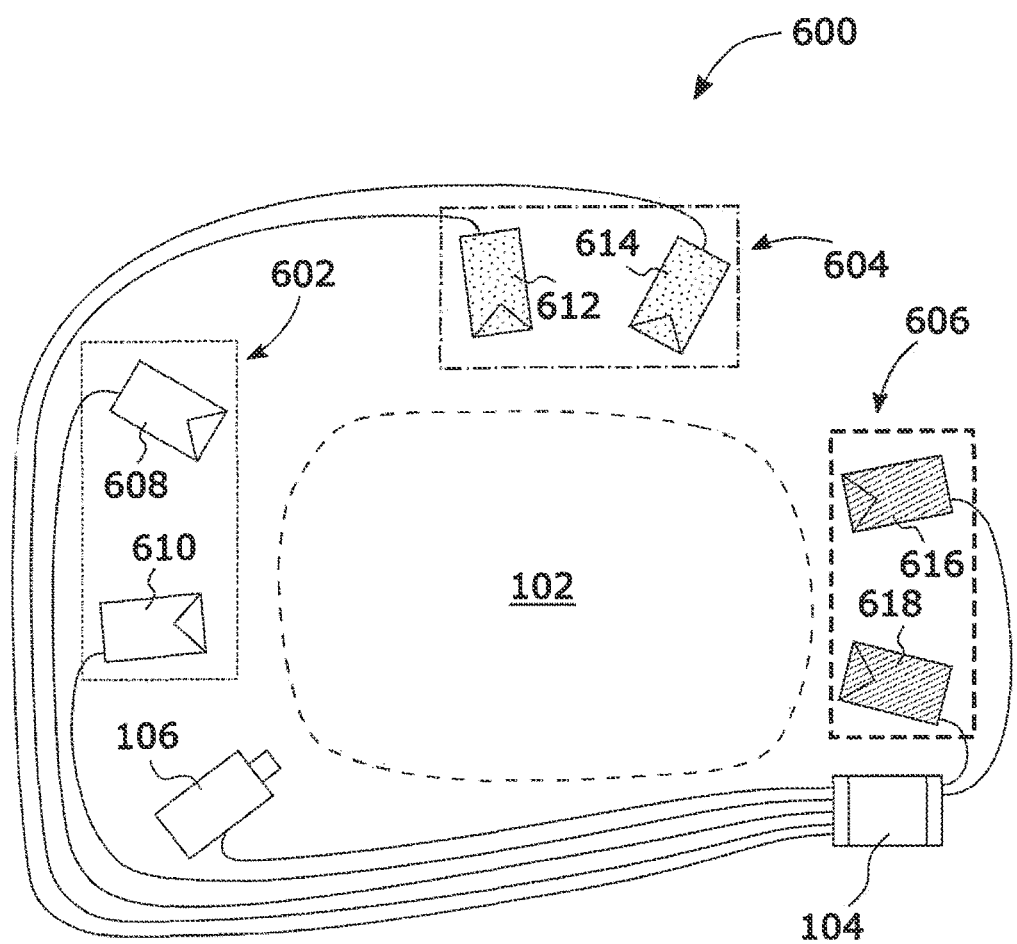
FIG. 6 is a schematic diagram of a scene lit by three lighting setups, each lighting setup having two strobe light sources, and each strobe light source controlled by a controller that receives timing signals from a camera recording the scene so as to provide the three lighting setups.

With reference to FIG. 6, a schematic diagram of a top view of a scene 102 lit with three lighting setups 602, 604, 606 is shown of an apparatus 600 for recording a scene using multiple lighting setups. Included is the controller 104 in communication with the camera 106 configured to record the scene 102. In this embodiment, a light source 608 and a light source 610 are included in a first lighting setup 602 to provide light for the scene 102 at the same time. A light source 612 and a light source 614 are included in a second lighting setup 604 to provide light for the scene 102 at the same time. In addition, a light source 616 and a light source 618 are included in a third lighting setup 606 to provide light for the scene 102 at the same time.

The controller 104 activates the first lighting setup 602 at a time within the "A" micro frames of the sequence of frames 126 (shown in FIG. 1), and the controller 104 activates the second lighting setup 604 within the "B" micro frames of the sequence of frames 126 (shown in FIG. 1). In addition, the controller 104 activates the third lighting setup 606 within the "C" micro frames of the sequence of frames 126 (shown in FIG. 1).

The first lighting setup 602 includes the light source 608 and the light source 610, both synchronized by the controller 104 to provide short duration illumination to the scene 102 at the same time, corresponding to the "A" micro frames in the sequence of frames 126 (shown in FIG. 1).

The second lighting setup 604 includes the light source 612 and the light source 614, both synchronized by the controller 104 to provide short duration illumination to the scene 102 at the same time, corresponding to the "B" micro frames in the sequence of frames 126 (shown in FIG. 1).

The third lighting setup 606 includes the light source 616 and the light source 618, both synchronized by the controller 104 to provide short duration illumination to the scene 102 at the same time, corresponding to the "C" micro frames in the sequence of frames 126 (shown in FIG. 1).

Each light source is controlled by the controller 104 that receives timing signals from the camera 106 recording the scene so as to provide sequential activations to the first lighting setup 602, the second lighting setup 604, and the third lighting setup 606.

Figure 7:
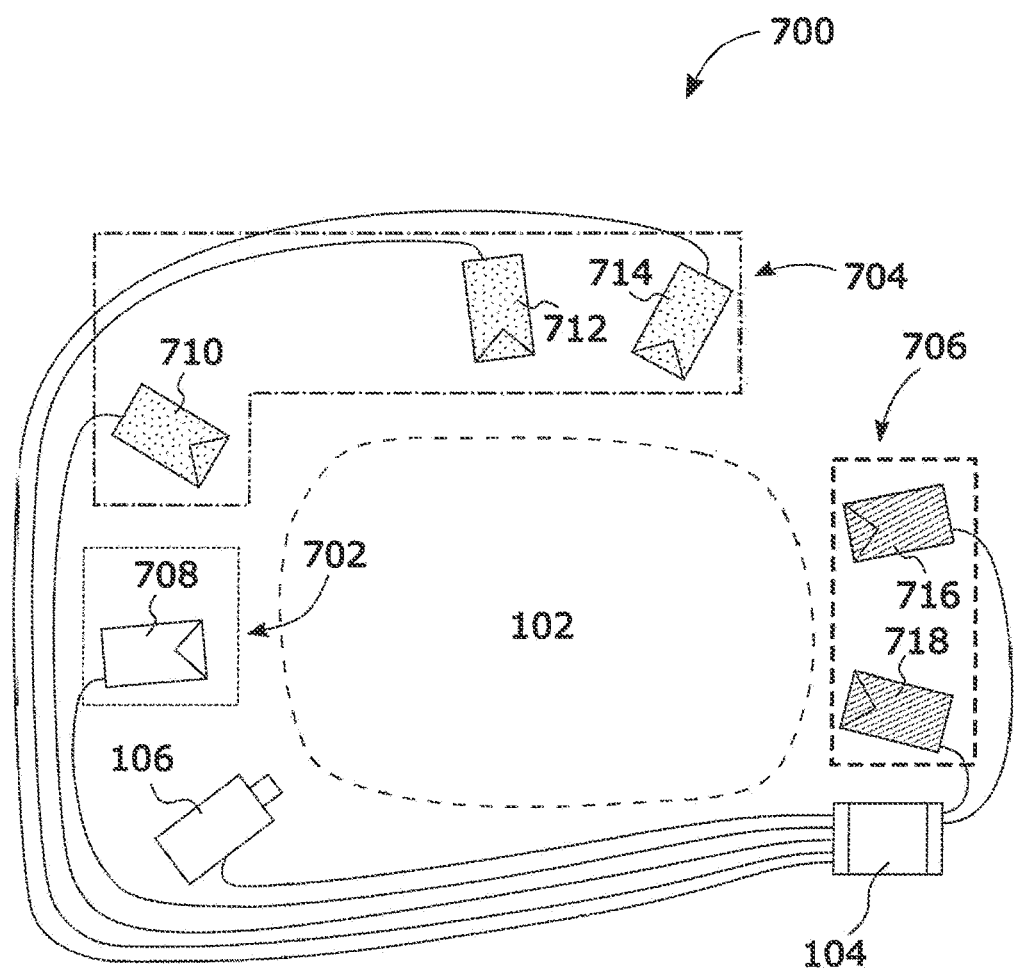
FIG. 7 is a schematic diagram of a scene lit with three lighting setups, a first lighting setup having one strobe light source, a second lighting setup having three strobe light sources, and a third lighting setup having two strobe light sources.

With reference to FIG. 7, a schematic diagram of a top view of a scene 102 lit with three lighting setups 702, 704, 706 is shown of an apparatus 700 for recording a scene using multiple lighting setups. Included is the controller 104 in communication with the camera 106 configured to record the scene 102. In this embodiment, a single light source 708 is included in a first lighting setup 702 to provide light for the scene 102. Three light sources 710, 712, and 714 are included in a second lighting setup 704 to provide light for the scene 102. In addition, two light sources 716 and 718 are included in a third lighting setup 706 to provide light for the scene 102.

The controller 104 activates the first lighting setup 702 at a time within the "A" micro frames of the sequence of frames 126 (shown in FIG. 1), and the controller 104 activates the second lighting setup 704 within the "B" micro frames of the sequence of frames 126 (shown in FIG. 1). In addition, the controller 104 activates the third lighting setup 706 within the "C" micro frames of the sequence of frames 126 (shown in FIG. 1).

The first lighting setup 702 includes the light source 708, synchronized by the controller 104 to provide short duration illumination to the scene 102, corresponding to the "A" micro frames in the sequence of frames 126 (shown in FIG. 1).

The second lighting setup 704 includes the light source 710, the light source 712 and the light source 714, all three synchronized by the controller 104 to provide short duration illumination to the scene 102 at the same time, corresponding to the "B" micro frames in the sequence of frames 126 (shown in FIG. 1).

The third lighting setup 706 includes the light source 716 and the light source 718, both synchronized by the controller 104 to provide short duration illumination to the scene 102 at the same time, corresponding to the "C" micro frames in the sequence of frames 126 (shown in FIG. 1).

Each light source is controlled by the controller 104 that receives timing signals from the camera 106 recording the scene so as to provide sequential activations to the first lighting setup 702, the second lighting setup 704, and the third lighting setup 706.

Figure 8:
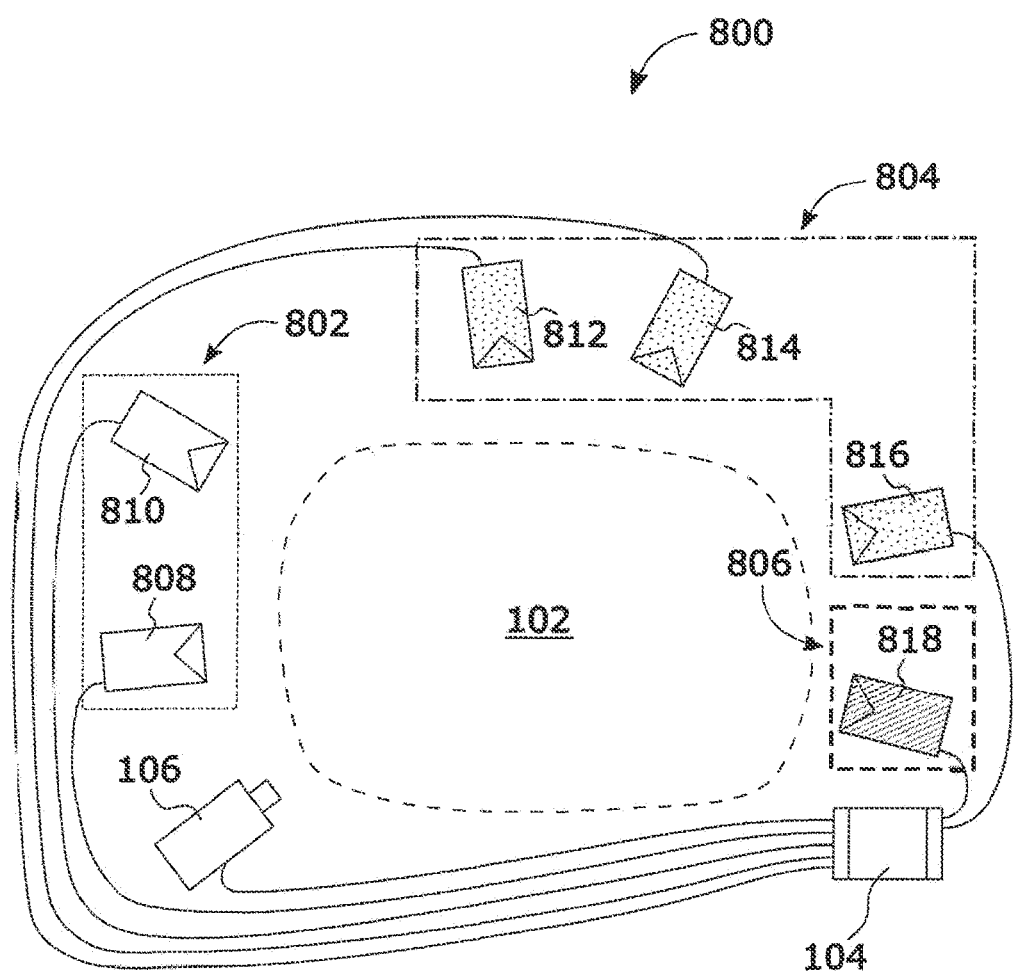
FIG. 8 is a schematic diagram of a scene lit with three lighting setups, the first lighting setup having two strobe light sources, the second lighting setup having three strobe light sources, and the third lighting setup having one strobe light source.

With reference to FIG. 8, a schematic diagram of a top view of a scene 102 lit with three lighting setups 802, 804, 806 is shown of an apparatus 800 for recording a scene using multiple lighting setups. Included is the controller 104 in communication with the camera 106 configured to record the scene 102. In this embodiment, light sources 808 and 810 are included in a first lighting setup 802 to provide light for the scene 102. Light sources 812, 814, and 816 are included in a second lighting setup 804 to provide light for the scene 102. In addition, a single light source 818 is included in a third lighting setup 806 to provide light for the scene 102.

The controller 104 activates the first lighting setup 802 at a time within the "A" micro frames of the sequence of frames 126 (shown in FIG. 1), and the controller 104 activates the second lighting setup 804 within the "B" micro frames of the sequence of frames 126 (shown in FIG. 1). In addition, the controller 104 activates the third lighting setup 806 within the "C" micro frames of the sequence of frames 126 (shown in FIG. 1).

The first lighting setup 802 includes the light source 808 and the light source 810, both synchronized by the controller 104 to provide short duration illumination to the scene 102 at the same time, corresponding to the "A" micro frames in the sequence of frames 126 (shown in FIG. 1).

The second lighting setup 804 includes the light source 812, the light source 814 and the light source 816, all three synchronized by the controller 104 to together provide short duration illumination to the scene 102 at the same time, corresponding to the "B" micro frames in the sequence of frames 126 (shown in FIG. 1).

The third lighting setup 806 includes the light source 818, synchronized by the controller 104 to provide short duration illumination to the scene 102, corresponding to the "C" micro frames in the sequence of frames 126 (shown in FIG. 1).

Each light source is controlled by the controller 104 that receives timing signals from the camera 106 recording the scene so as to provide sequential activations to the first lighting setup 802, the second lighting setup 804, and the third lighting setup 806.

Figure 9:
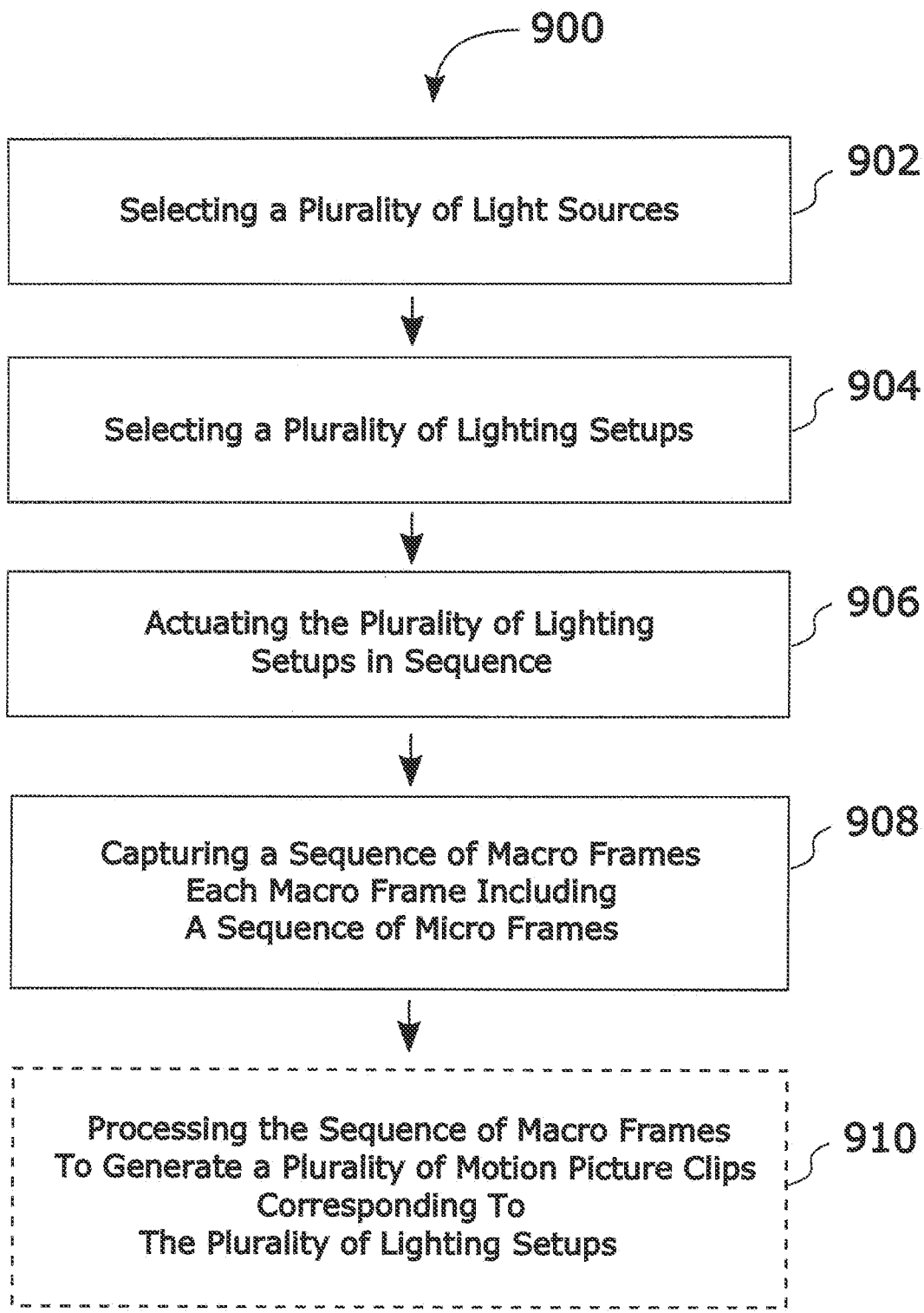
FIG. 9 is a flow chart of a method for recording a scene using a sequence of lighting setups so as to concurrently produce motion picture clips of footage of the scene for each lighting setup, each motion picture clip of footage having minimized time offset with respect to each other.

With reference to FIG. 9, a flow chart is shown for a method 900 for recording a scene using a plurality of lighting setups so as to concurrently produce motion picture footage of the scene for each lighting setup of the scene, the motion picture clips having minimized time offset with respect to each other.

The method includes selecting 902 a plurality of light sources, with each light source configured to illuminate the scene 102 (shown in FIG. 1).

Next, the method 900 includes selecting 904 a plurality of lighting setups from the plurality of light sources, and then actuating 906 the plurality of lighting setups in sequence from the plurality of light sources. Each lighting setup can be selected so as to be different from the other lighting setups, or two lighting setups can share one or more light sources in common.

The method 900 next includes capturing 908 a sequence of macro frames, each macro frame including a sequence of micro frames, in accordance with timing signals, including actuating each lighting setup corresponding to each micro frame, in the sequence of micro frames within each macro frame.

Optionally, the method 900 may also include processing 910 the sequence of macro frames to generate a plurality of motion picture clips corresponding to the plurality of lighting setups.

$1/60^{th}$ of a second is a common threshold whereby a number of everyday types of motions appear frozen at this recording speed or faster. At a frame rate of 60 FPS, each frame has a duration of $1/60^{th}$ of a second, equal to 16.6667 milliseconds.

Figure 10:
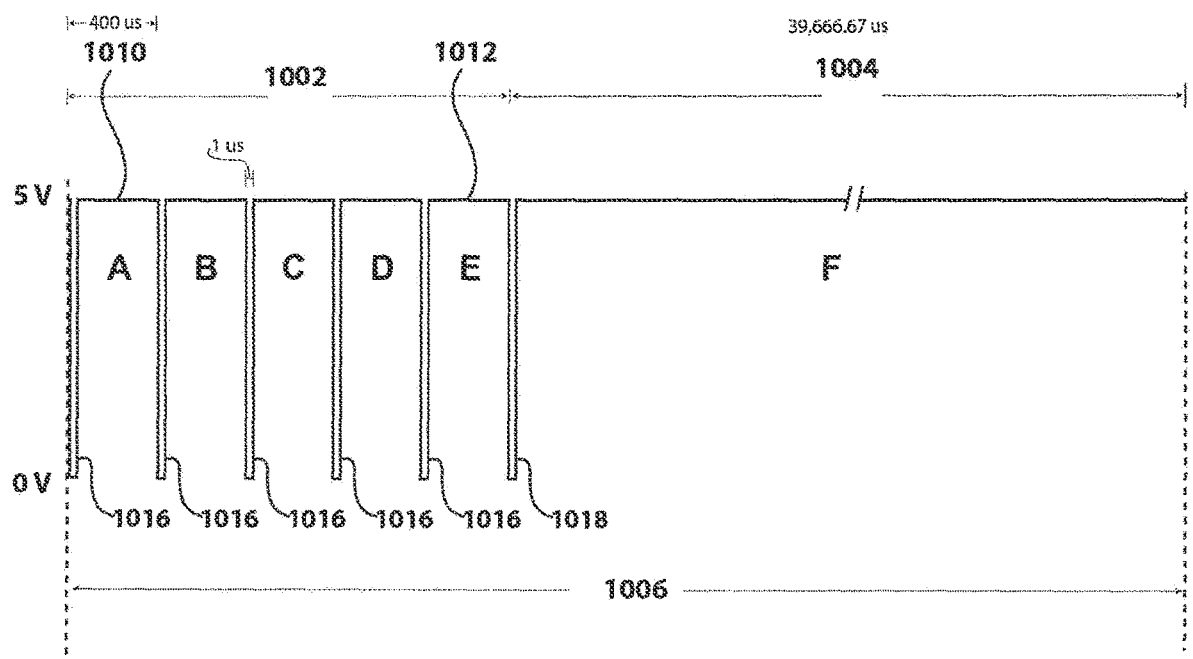
FIG. 10 is a timing diagram showing some exemplary timing values.

Referring to FIG. 10, a timing diagram is presented showing some exemplary timing values. For example, the micro frame A can be 400 microseconds. The pulse 1016 can be 1 microsecond, and the long frame F can be 39, 666.67 microseconds.

Figure 11:
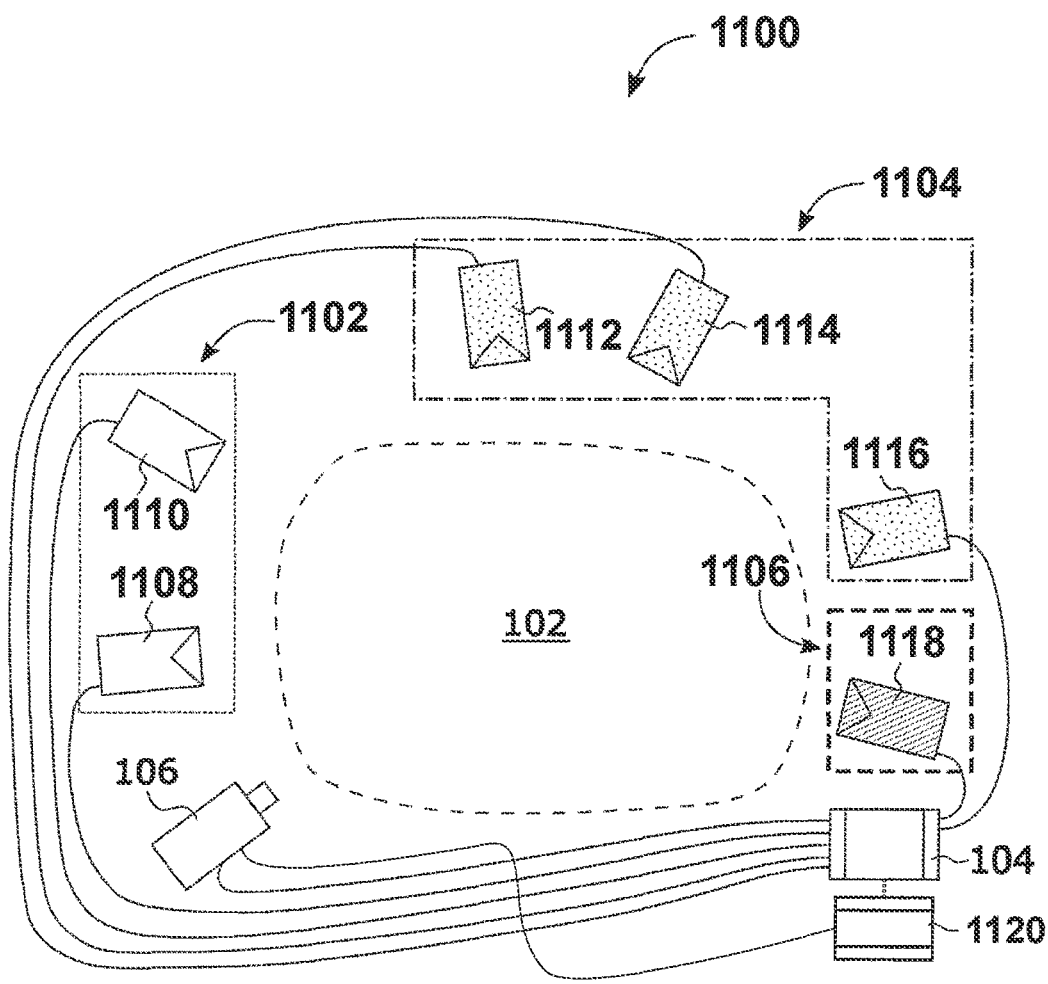
FIG. 11 is a schematic diagram of a scene illuminated sequentially by the three lighting setups of FIG. 8, further including an external controller that provides timing signals to both the camera and the controller.

With reference to FIG. 11, a scene 102 is illuminated sequentially by the three lighting setups 1102, 1104, 1106, further including an external controller 1120 that provides timing signals to both the camera 106 and the controller 104.

Instead of using the internal settings of the camera 106, an external controller 1120 can serve as a signal generator to provide a signal to the camera 106 which determines the timings of the macro and micro frames. One example of this is a waveform generator (such as the Keysight™ 33511B) which, when attached with a BNC cable, to the F-Sync connector on a high speed camera such as the Vision Research™ v2460, can supply the necessary signal. In the example of the Keysight™ 33511B, the signal is a 5V signal which drops to 0V for at least one microsecond to close out the previous frame and to cause a new frame to start. The signal then returns to 5V.

For example, FIG. 10 shows one cycle of the signal from the waveform generator as it is provided to the camera so as to fire five micro frames, each micro frame being of a duration of 400 microseconds, and one longer frame lasting 39,666.67 microseconds. These frames give a combined macro frame with a duration of $1/24$th of a second. This signal is sent through repeatedly for the number of iterations to run the camera for the desired shot length.

For example, to run the camera for a 10 second shot, the signal in FIG. 10 would be repeated 240 times (as each repetition is ¹/₂₄th of a second). In this example, as shown in FIG. 11, the waveform generator serves as an external controller 1120 that is connected to the camera 106, and provides a stream of timing signals to the camera 106.

In other embodiments, the external controller 1120 can be a 'custom controller' or other device generating timing signals, including the F-sync type outlined above, and others commonly used in the industry such as Genlock™ (Tri Level, BiLevel), FrameSync™, Strobe Signal, or RIG. In addition to sending signals directly to the camera, 1120 can also be connected directly to the main system controller 104 (shown as a dashed line between 1120 and 104 in FIG. 11). In this way, the external controller 1120 can send signals to the camera 106 and to the main system controller 104. Alternatively, the external controller 1120 and the main system controller 104 can operate in tandem, exchanging signals with the camera 106 and sending signals to the lights to fire.

Thus, in some embodiments, the timing signals are derived from the external controller 1120 that controls the camera 106, and the camera 106 controls the lighting setups 108, 110, 112.

This can be done in a variety of ways which involve the system controller 104 and/or the external controller 1120:

An external controller 1120 generates signals for the micro frames and the long frames which are sent to the camera 106, which sends them on to the system controller 104.

An external controller 1120 generates signals for the micro frames and the long frames which are sent both to the camera 106 and to the system controller 104.

An external controller 1120 generates signals for the micro frames and the long frames which are sent to the camera 106, and in unison with these timing signals it also signals the lights to fire. Thus, there is only one controller (external controller 1120) which sends signals directly to the camera and to the lights.

An external controller 1120 generates signals for the micro frames and the long frames which are sent to the camera 106. The camera 106 sends a signal back to the external controller 1120, which then uses that signal as the basis for sending signals to the lights to fire. Thus, there is only one controller (external controller 1120) which sends signals directly to the camera and to the lights.

In some embodiments, the lights receive signals from the external controller 1120 or the controller 104 to trigger at a FPS (frame rate) that is a multiple of the FPS (frame rate) at which the camera 106 is recording. Thus, the lights can operate at a firing rate which is a multiple of the camera frame rate. For example the camera 106 can run at 24 FPS, while the lights are still synced as explained above, but run at a rate of 96 FPS.

Other modifications and implementations will occur to those skilled in the art without departing from the spirit and the scope of the invention as claimed. Accordingly, the above description is not intended to limit the invention, except as indicated in the following claims.

What is claimed is:

1. An apparatus for recording a scene using a plurality of lighting setups so as to concurrently record a respective plurality of motion picture clips of the scene, one motion picture clip for each lighting setup, the apparatus comprising:
a plurality of light sources, each light source configured to illuminate at least part of a scene;
a controller configured to:
enable a user to define a plurality of lighting setups using the plurality of light sources, and
actuate the plurality of lighting setups in accordance with timing signals so as to provide a sequence of lighting setups,
the controller configured to actuate the plurality of lighting setups in sequence in accordance with the timing signals,
such that a first lighting setup of the plurality of lighting setups is actuated by a timing signal upon a beginning of a macro frame, and
a last lighting setup of the plurality of lighting setups is actuated by a timing signal such that the last lighting setup will go dark before an end of the macro frame; and
a camera configured to capture a sequence of macro frames, each macro frame being of a duration so as to include a sequence of micro frames, the sequence of micro frames being of a duration of no more than substantially 21 milliseconds, each micro frame initiated by a timing signal, and at least one micro frame being capable of capturing the scene illuminated by one of the plurality of lighting setups.

2. The apparatus of claim 1, wherein the camera is a variable frame rate camera configured to capture micro frames during only a portion of each macro frame, the portion corresponding to the duration of the sequence of micro frames.

3. The apparatus of claim 2, wherein the variable frame rate camera is configured to capture only the sequence of micro frames in each macro frame.

4. The apparatus of claim 2, wherein the variable frame rate camera is configured to capture at least one long micro frame after capturing the sequence of micro frames, the long micro frame being of an extended duration configured to capture light from a continuous light source.

5. The apparatus of claim 1, wherein the camera is a constant frame rate camera configured to record during only a portion of each macro frame, the portion corresponding to the duration of the sequence of micro frames.

6. The apparatus of claim 1, further comprising:
a processing module configured to assemble a plurality of motion picture clips,
each motion picture clip assembled from a sequence of corresponding micro frames of the sequence of macro frames,
each motion picture clip corresponding to one of the lighting setups.

7. The apparatus of claim 1, wherein the timing signals are derived from the camera.

8. The apparatus of claim 1, wherein the timing signals are derived from an external controller.

9. The apparatus of claim 1, wherein the controller is configured to:
enable the user to include at least one camera parameter that can change for each micro frame; and
sequentially actuate the at least one camera parameter for each of the micro frames in accordance with timing signals.

10. The apparatus of claim 9, wherein the at least one camera parameter can include at least one of:
sensitivity (ISO); aperture; ND (neutral density filter); and shutter angle.

11. The apparatus of claim 1, wherein each lighting setup of the plurality of lighting setups is different from other lighting setups in the plurality of lighting setups.

* * * * *